United States Patent [19]

Nonaka et al.

[11] Patent Number: 5,219,398
[45] Date of Patent: Jun. 15, 1993

[54] CONTROL DEVICE FOR INTERNAL COMBUSTION ENGINE

[75] Inventors: Kimihiro Nonaka; Yukio Matsushita, both of Hamamatsu, Japan

[73] Assignee: Yamaha Hatsudoki Kabushiki Kaisha, Iwata, Japan

[21] Appl. No.: 927,053

[22] Filed: Aug. 5, 1992

Related U.S. Application Data

[63] Continuation-in-part of Ser. No. 743,267, Aug. 9, 1991.

[30] Foreign Application Priority Data

Aug. 10, 1990 [JP] Japan .................................. 2-210239
Aug. 9, 1991 [JP] Japan .................................. 3-223533

[51] Int. Cl.$^5$ ........................ F02P 7/06; F02P 41/18
[52] U.S. Cl. ................................. 123/414; 123/73 R
[58] Field of Search ................... 123/414, 435, 73 R, 123/73 A, 478, 488, 494, 414; 73/118.2; 364/431.04; 324/208

[56] References Cited

U.S. PATENT DOCUMENTS

| | | | |
|---|---|---|---|
| 4,385,605 | 5/1983 | Petric et al. ......................... | 123/414 |
| 4,413,508 | 11/1983 | Kawamura et al. ................. | 123/478 |
| 4,446,833 | 5/1984 | Matsushita et al. ................. | 123/435 |
| 4,461,260 | 7/1984 | Nonaka et al. ...................... | 123/478 |
| 4,814,704 | 3/1989 | Zerrian, Jr. et al. ................ | 324/208 |
| 4,858,158 | 8/1989 | Ishikawa ......................... | 364/571.01 |
| 5,041,979 | 8/1991 | Hirka et al. ..................... | 364/431.04 |

FOREIGN PATENT DOCUMENTS 59-5875  1/1984  Japan ................................. 123/41 X

*Primary Examiner*—Raymond A. Nelli
*Attorney, Agent, or Firm*—Ernest A. Beutler

[57] ABSTRACT

This invention relates to an event timing apparatus for an internal combustion engine, and more particularly to an improved control arrangement for a fuel injection and ignition arrangement. In accordance with this invention, a timing detecting arrangement is disclosed having a timing correcting circuit for correcting deviations between the actual timing measurements made and the true, desired timing signal required for accurate operation of the fuel injection system. Thus, a fuel injection system and ignition system is provided that is able to provide accurate crank angle timing measurements with reference to which crank chamber pressure and other measurements may be made, in spite of possible manufacturing and/or assembling variations in the timing measuring means. The way in which the manufacturing or assembling of variations are measured is also disclosed.

60 Claims, 8 Drawing Sheets

CONTROL DEVICE FOR INTERNAL COMBUSTION ENGINE

CROSS-REFERENCE TO RELATED APPLICATION

This application is a continuation-in-part of our application Ser. No. 07/743,267, filed Aug. 9, 1991 now abandoned, entitled "Fuel Injection System Of Internal Combustion Engine", which application is assigned to the Assignee hereof.

BACKGROUND OF THE INVENTION

This invention relates to a control device for internal combustion engines and more particularly to an improved event timing arrangement for an internal combustion engine.

In internal combustion engines, a number of events which occur in the combustion chamber or other portions of the engine are controlled at a specific timing with respect to the cycle of the engine. If the engine is a reciprocating engine, the timing is controlled in relation to the respective position of the piston in the combustion chamber. Normally, the timings are determined from the top dead center position. Similar timing controls are employed in rotary engines which operate on a cycle and again the timing is usually based upon timings relative to the time when the combustion chamber is at its minimum volume, corresponding to top dead center of the piston of a reciprocating engine. Normally all timing events are based upon the angular rotation of the crankshaft or engine output shaft relative to top dead center.

A triggering arrangement for the timing mechanism is provided which is designed so as to provide an output signal when the engine is at its top dead center or minimum volume condition. These timing devices normally include a toothed wheel that is driven by the engine output shaft and which cooperates with a sensor coil mounted in a fixed relationship to the output shaft. Obviously, there are a number of variations which can occur in both the mounting of the toothed wheel and the mounting of the sensor coil. These positional variations can cause all of the timed events to occur at an imprecise time or engine output shaft angular relationship, with resulting deterioration in engine performance.

In addition to these variations, the mounting of the piston relative to the engine output shaft in a reciprocating engine or the rotary member associated with the output shaft in a rotary engine relative to the output shaft can vary because of a number of reasons. Therefore, even if the toothed wheel and sensor coil are accurately located relative to each other, there still can be variations in timing which are undesirable.

It is, therefore, a principle object to this invention to provide an improved event timing arrangement for an internal combustion engine.

It is a further object to this invention to provide an improved timing arrangement for an internal combustion engine wherein the timing signal can be adjusted in response to the measured parameters of the engine.

It is a further object to this invention to provide an improved method for adjusting the timing of an internal combustion engine.

The timed events can be those of many different types. For example, in fuel injected engines, in addition to controlling accurately the timing of injection it is extremely important to accurately control the quantity of fuel injected in accordance with the air inducted in order to achieve the optimum fuel/air ratio for a given operating condition of the engine.

Various devices have been proposed for measuring the air flow in an induction system of an engine to control the amount of fuel injected. Conventionally, such air flow measuring devices have been large and complicated, and have been positioned in the induction system, normally upstream of the point of discharge of the fuel. In one type of flow detector, a flap type arrangement is provided in the intake passage and has a member that swings open to an amount that is determined by the air flow. The angular position of this detector is then measured and used to provide an air flow signal for the fuel injection system. Alternatively, vortex type air flow meters have been positioned in the induction system for determining air flow. Still another type of measuring device employs a hot wire anemometer which provides an electrical resistance wire interposed in the air stream to have its resistance vary in relation to the speed, i.e., cooling effect, of the air flowing through the induction system. The use of such flow meters in the induction system has several disadvantages.

In the first instance, the provision of an air flow measuring device in the induction system can oftentimes reduce the volumetric efficiency of the induction system. Furthermore, such devices substantially increase the size of the induction system. Also, devices of the type aforementioned are not particularly efficient with engines having a low number of cylinders or specifically with single cylinder engines due to the pulsations in the intake flow. Although such pulsations may be reduced to some extend through the use of a plenum chamber, this adds still further to the size of the induction system. Furthermore, if the flow meter is used in conjunction with the internal combustion engine of an outboard motor or other marine application, there is a high likelihood of corrosion in the moving components of the flow meter due to the salt in the atmosphere.

In U.S. Pat. No. 4,446,833 to Matsushita et al., and assigned to the assignee hereof, there is disclosed a control for a fuel injection system that has none of the foregoing disadvantages. The system disclosed in that patent senses the pressure in the crankcase of a two-cycle engine and uses the sensed pressure to measure air flow and control the amount of fuel injected. It has been found that the pressure in the crankcase, if accurately measured, is indicative of the amount of air induced.

Japanese Provisional Patent Publication Sho59-5875 discloses an engine wherein the air intake amount, for determining a proper amount of fuel for injection, is determined by making two separate pressure measurements during each crankshaft rotation. A value for the air intake amount is obtained by measuring the air pressure at a crankshaft position near the scavenging port opening timing, which is representative of the mass of the air remaining in the crank chamber at the beginning of the scavenging stroke; and, also, measuring the air pressure at a crankshaft position near the scavenging port closing timing, which is representative of the mass of the air remaining in the crank chamber at the termination of the scavenging stroke.

With the systems just described, it is extremely important that each pressure measurement that is made, be made at a precise predetermined timing, indicative of the crank angle position, by the particular timing detecting means employed; for example, a crank angle wheel and sensor coil arrangement.

For the reasons noted above during the actual operation of an engine, it may occur that the timing detecting means is unable to deliver a precise timing signal due to manufacturing and/or assembling variations of the component parts. Such variations may cause the measured timing to deviate from the true, and desired, timing measurement. When the timing detecting means is unable to ascertain and provide the true timing signal, any crank chamber pressure measurement relying on such timing detecting means will consequently be in error. That is, the desired crank chamber pressure measurements cannot be ascertained, thereby causing an error in any calculated air intake amount which, in turn, results in a decreased accuracy in fuel injection amount control.

In addition to the timing of the pressure measurements in order to measure air flow, it is, as has been discussed above, extremely important to insure that the timing of beginning of fuel injection occur at a precise engine output shaft angle. Thus, with a fuel injection system it is important not only to be able to measure crankshaft angle position accurately so as to determine the amount of fuel required, but also so as to insure the accurate timing of fuel injection relative to the position of the piston.

In addition to the timing of the fuel injection of an engine, there are a number of other events which must be accurately timed. For example, the timing of spark firing in spark ignited engines is also extremely critical. The methods which have been employed for controlling spark timing are similar to those discussed above in that they include a timing wheel driven by the engine output shaft and in an associated sensor, with the possible defects aforenoted.

It is, therefore, a still further object to this invention to provide an improved timing arrangement and method for determining the timing of an event in an internal combustion engine which can be extremely accurate and adjusted to accommodate specific manufacturing variations in a given engine.

It is a further object to this invention to provide an improved fuel injection system for an internal combustion engine.

It is another object to this invention to provide an improved spark ignition system for an internal combustion engine.

SUMMARY OF THE INVENTION

The invention is adapted to be embodied in an event timing arrangement for an internal combustion engine having an engine output shaft, a pair of relatively moveable components which define a combustion chamber and at least one of those components is operatively connected to the engine output shaft for driving the engine output shaft. Timing means are incorporating for effecting a timed event for the engine at a predetermined angular position of the engine output shaft.

In accordance with a first feature of the invention, indicating means are driven in timed relationship to the engine output shaft and a signal generating means is affixed relative to one of the engine components and juxtaposed to the indicating means for generating a basic timing signal in response to the passage of the indicating means passed the signal generating means. An adjusting circuit is provided for adjusting the output of the signal generating means in order to vary the timing of the signal to adjust for discrepancies in the relative locations of the indicating means and the signal generating means for initiating operation of the timed event at a precise engine output shaft angle.

Another feature of the invention is adapted to be embodied in a method for timing the engine event in an engine of the type described previously. In accordance with this method, indicating means are driven in timed relationship to the engine output shaft and a signal generating means is fixed relative to one of the engine components and is juxtaposed to the indicating means for generating a basic timing signal in response to the passage of the indicating means passed the signal generating means. An adjusting circuit is provided for adjusting the output of the signal generating means in order to vary the timing of the signal to adjust for discrepancies in the relative locations of the indicating means and the signal generating means for initiating the operation of the timing means at a precise engine output angle.

DETAILED DESCRIPTION OF THE PREFERRED EMBODIMENT OF THE INVENTION

Figure 1:
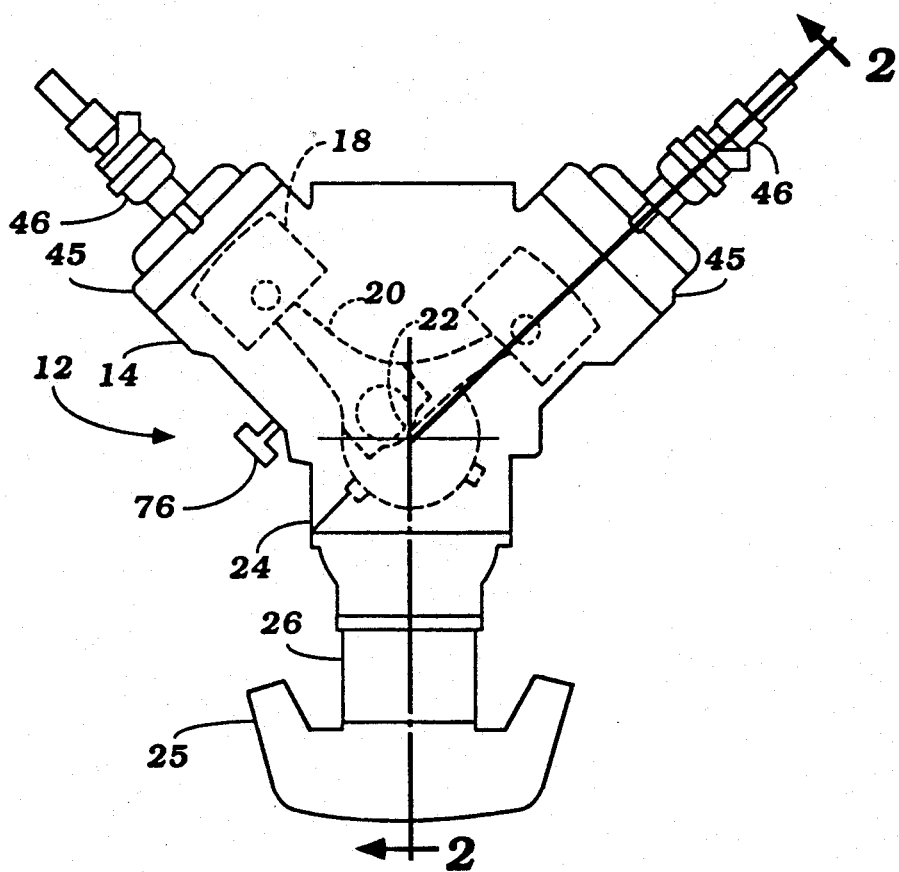
FIG. 1 is a top plan view of an engine constructed and operated in accordance with an embodiment of the invention.
Figure 2:
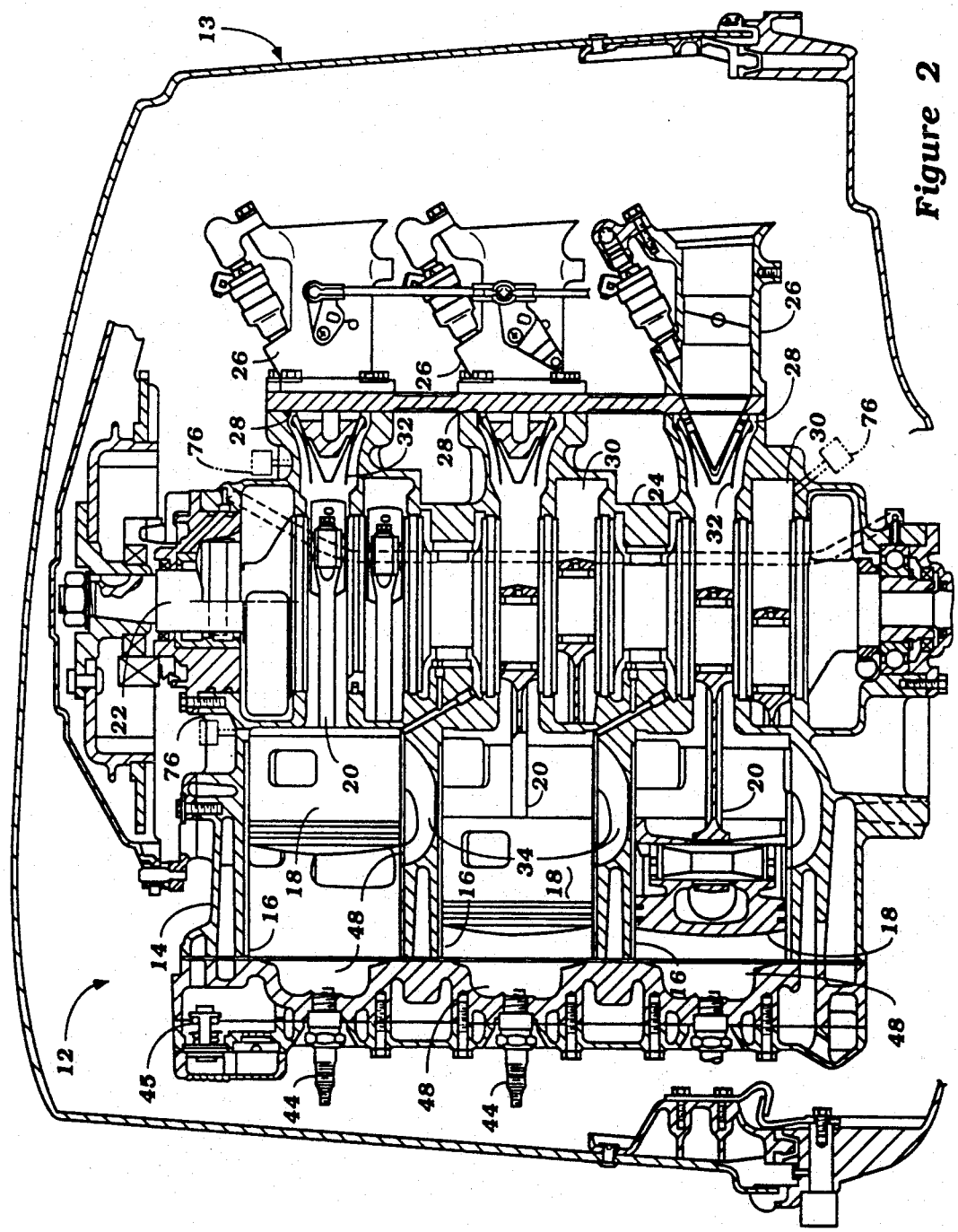
FIG. 2 is an enlarged cross-sectional view of the engine taken along the line 2—2 of FIG. 1 and showing the engine in an outboard motor.
Figure 3:
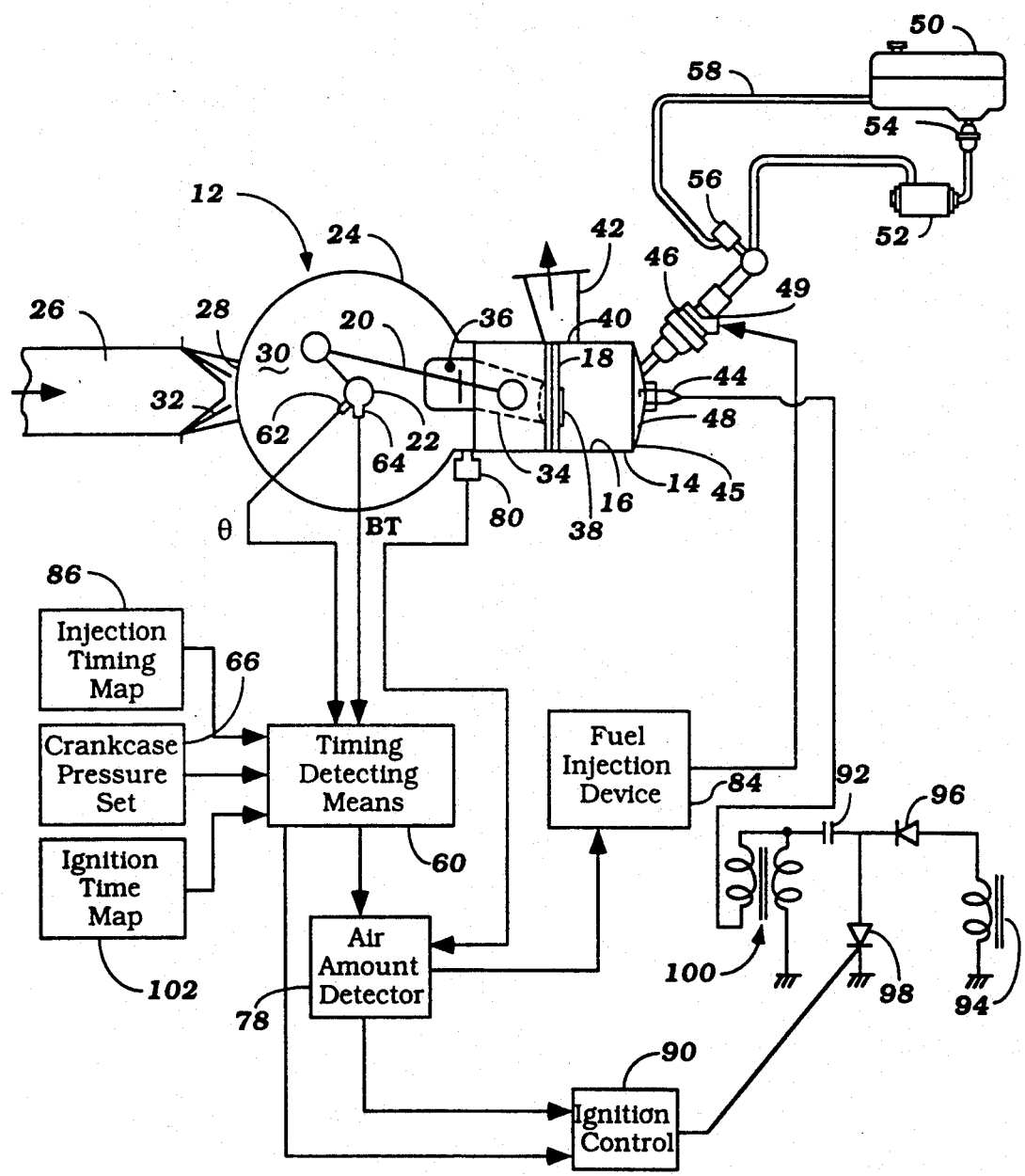
FIG. 3 is a partially schematic view of the engine and shows the associated fuel injection and ignition systems partially schematically.

Referring now specifically to FIGS. 1 through 3, a two cycle, crankcase compression, internal combustion engine is identified generally by the reference numeral 12. The engine 12, for purposes of illustration, is depicted in the figures as being applied for powering an outboard motor. This type of application is depicted as it is a typical one in which two cycle, crankcase compression, internal combustion engines are normally employed.

Only the power head of outboard motor is depicted in FIG. 2 and the protective cowling encircling the engine 12 is shown in this figure and is identified generally by the reference numeral 13. Obviously, the engine 12 may be employed in other types of applications for two cycle, internal combustion engines. In addition, the invention may be employed in conjunction with other types of engines than those operating on the two cycle, crankcase compression principal, although certain facets of the invention have particular utility in such application. For example, the invention may be employed in conjunction with the reciprocating engines operating on the four stroke cycle principal or may be employed in rotary type engines operating on any type of cycle.

The engine 12 includes a cylinder block 14 having a V-6 configuration with a plurality of cylinder bores 16 in which pistons 18 are supported for reciprocation in a known manner. The pistons 18 are connected by means of respective connecting rods 20 to a crankshaft 22 that is rotatably journaled about a vertically extending axis as is common with outboard motor practice in a known manner in a crankcase 24 of the engine 12.

The crankcase 24 of the engine 12 is divided into a plurality of separate chambers, each sealed from the other, as is well known in two cycle engine practice. Each sealed chamber is associated with a respective one of the cylinder bores 16.

The engine 12 includes an intake system that comprises an air inlet device 25 which draws air from within the protective cowling 13 and delivers it to a respective air induction passage 26 that terminates in an intake port 28 that communicates with a respective one of the sealed crankcase chambers 30 within the crankcase 24. A reed type check valve 32 is positioned in each of the induction passages 26 so as to prevent undesirable reverse flow from the crankcase chamber 30 back into the induction system 26.

One or more transfer or scavenge passages 34 extend through the cylinder block 14 from an inlet opening 36 in the crankcase chamber 30. The upper end of the scavenge or transfer passages 34 terminate in inlet scavenge ports 38 formed in the cylinder wall 16 at a point above the bottom dead center position of the piston 18.

Exhaust ports 40 are also formed in each cylinder bore 16 and communicate with exhaust passages 42 for the discharge of exhaust gases to the atmosphere through a suitable exhaust system (not shown). The exhaust ports 40 are positioned above the bottom dead center position of the pistons 18 and are slightly higher in the cylinder bores 16 than the transfer or scavenge ports 38.

Spark plugs 44 are provided in the cylinder heads 45 of the engine 12 for firing a charge. The spark plugs 44 are fired by an ignited system, to be described.

The engine 12 is provided with a fuel injection system that includes injection nozzles 46 that discharge into a respective combustion chamber 48 formed by the cylinder head 45, pistons 18 and cylinders 16 of the block cylinder block 14. Each injection nozzle 46 includes an electro-magnetic controller 49 that controls the timing and amount of fuel discharged by the nozzle 46. Fuel is supplied to the nozzle 46 from a fuel tank 50 by means of an appropriate fuel pump 52. A fuel filter or strainer 54 is interposed in the conduit connecting the fuel tank 50 with the pump 52. A pressure control valve 56 is provided in the supply line to the fuel injection nozzle 46 and has a return line 58 that extends back to the fuel tank 50. The valve 56 insures that a substantially constant pressure of fuel is delivered to the injection nozzle 46 by bypassing fuel back to the tank 50 in a well known manner.

During running of the engine 12, an intake air charge is delivered to the induction pipe 26 which is admitted to the crankcase chamber 30 when the pistons 18 move upwardly. The reed valve 32 will be opened under this condition so long as the pressure upstream of it exceeds the pressure on its downstream side. At the same time the pistons 18 are moving upwardly to induct the air charge into the crankcase chamber 30, the spent combustion products will be discharged through exhaust ports 40 and exhaust passages 42. The inducted air charge is compressed upon downward movement of the pistons and is then transferred from the crankcase chamber 30 to the upper side of the pistons 18 through the transfer or scavenge passages 34. Proximate to this event, a fuel charge is delivered into the combustion chamber via the injection nozzle 46. Thus a fuel/air charge is then present in the combustion chamber near to the spark plug 44 for firing.

The construction of the engine 12 as thus far described may be considered to be conventional. For that reason, further details of the construction of the engine are not believed to be necessary to enable those skilled in the art to practice the invention.

As has been noted in U.S. Pat. No. 4,446,833, accurate control of the amount of fuel injected by the nozzle is extremely important as is the timing of fuel injection. In that patent, several embodiments are disclosed that provide fuel control in response to pressure in the crankcase chamber, which has been found to be an accurate indicator of the amount of air inducted. By controlling the amount of fuel injected by the nozzle in response to pressure in the crankcase chamber, it is possible to provide good fuel control without the disadvantages of air flow measurement devices positioned in the intake pipe, as have been previously employed.

One embodiment of the '833 patent provides fuel control by sensing the maximum and minimum pressures existent in the crankcase chamber and using the difference as a control signal indicative of the amount of air inducted. Such an arrangement has particular utility since this pressure difference, if correctly measured, is a very accurate measurement of air flow. During the actual operation of an engine, however, it may occur that the timing detecting means is unable to deliver a precise timing signal due to manufacturing and/or assembling variations of the component parts as aforenoted. Such errors may cause the measured timing to deviate from the true, and desired, timing measurement.

In accordance with this invention, a timing detecting arrangement is disclosed having a timing correcting circuit for correcting deviations between the actual timing measurements made and the true, desired timing signal required for accurate operation of the fuel injection system and also of the ignition system.

Figure 4:
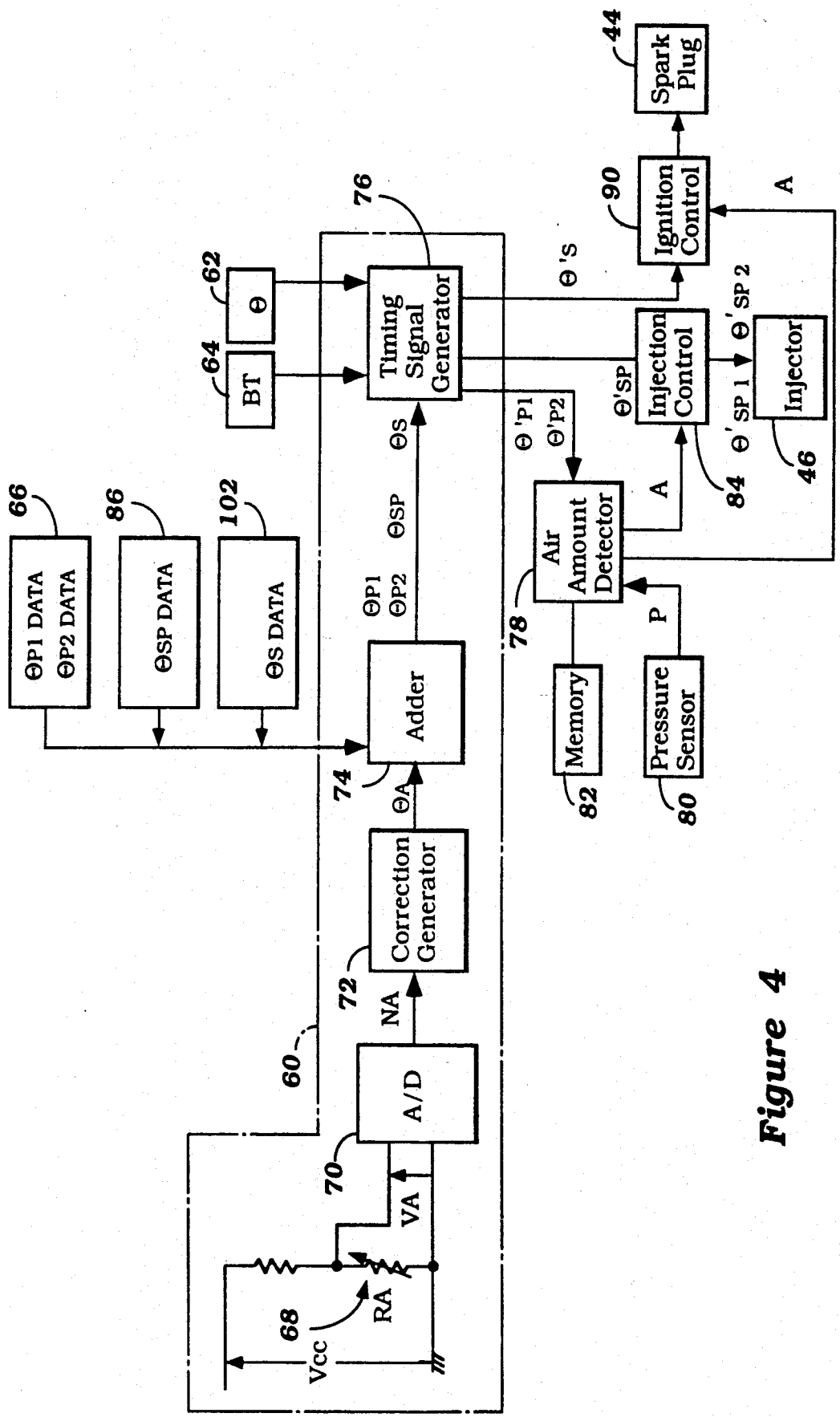
FIG. 4 is a schematic representation of a timing detecting means, including a timing error correcting circuit, and it relation to the fuel injection and ignition systems in accordance with the invention.

The control arrangement for the fuel injection system of the invention will first be described. As has been noted, the fuel injector 46 is electronically controlled. For control purposes there is provided a timing detecting means, shown schematically in FIG. 3 and in more detail in FIG. 4 and identified by the reference numeral 60, that receives a plurality of input signals indicative of engine conditions. These signals include a signal from a crank angle sensor 62 for sensing the angular position Θ of the crankshaft 22 and a basic timing signal, BT, generated by a basic timing sensor 64 mounted around the crankshaft 22 and which detects the basic timing at the crankshaft 22. The crank angle sensor 62 and the basic timing sensor 64 may comprise known type of inductive sensors such as pulser coils which cooperate with a toothed wheel that is fixed for rotation with the crankshaft 22, as is well known in this art.

The timing detecting means 60 additionally receives pre-set scavenge port event timing signals $\Theta_{P1DATA}$ and $\Theta_{P2DATA}$, which are based upon predetermined basic scavenge port event timing values which are determined by measurements made directly from the engine, from a crankcase pressure timing setting means 66. These values correspond to the scavenging ports 38 opening timing and scavenging ports 38 closing timing, respectively. These are the desired crank angles upon pressure readings should be taken to accurately determine air flow.

The timing correcting circuit of the invention is shown more specifically in FIG. 3. A variable resistor 68 which is set in a manner to be described; an analog to digital (A/D) converter 70; correction value generator 72 and adder 74 together constitute the timing correcting circuit within the timing detecting means 60. With additional reference to FIG. 5, when the measured basic timing signal has a deviation $\Theta_A$ from the true basic timing value, determined as will be described by reference to FIG. 10, the adder 74 adds the amount of the deviation (which is the correction value) $\Theta_A$ to the pre-set timing signals $\Theta_{P1DATA}$ and $\Theta_{P2DATA}$, thus generating corrected timing values $\Theta_{P1}$ and $\Theta_{P2}$, respectively. These corrected timing values $\Theta_{P1}$ and $\Theta_{P2}$ are then transferred to a timing signal generator 76 of the timing detecting means 60.

The timing signal generator 76 then outputs signals to an air amount detector 78. The air amount detector 78 takes a pressure reading at crank angles close to the scavenge port opening and closings, $\Theta_{P1}$ and $\Theta_{P2}$. The measurements are not taken exactly at these times but at a slightly offset timing $\Theta'_{P1}$ and $\Theta'_{P2}$. At these crank angles, pressure is read by means of a pressure sensor 80 which senses the pressure in the crankcase chamber 30. The pressure sensor 80 may be located in several different alternate positions, as will be described later by reference to FIGS. 9A, 9B and 9C. The amount of air A inducted into the crankcase chambers 32 is calculated by the detector 78 based upon data from a memory 82 which has been pre-programmed to indicate the amount of air $G_1$ and $G_2$ represented by the sensed pressures $\Theta'_{P1}$ and $\Theta'_{P2}$ so as to output an intake air amount signal A equal to the difference between the amount of air at each pressure sensing point $\Theta'_{P1}$ and $\Theta'_{P2}$:

$$A = G_2 - G_1$$

This output signal A is then transmitted to the fuel injection control device 84.

Figure 5:
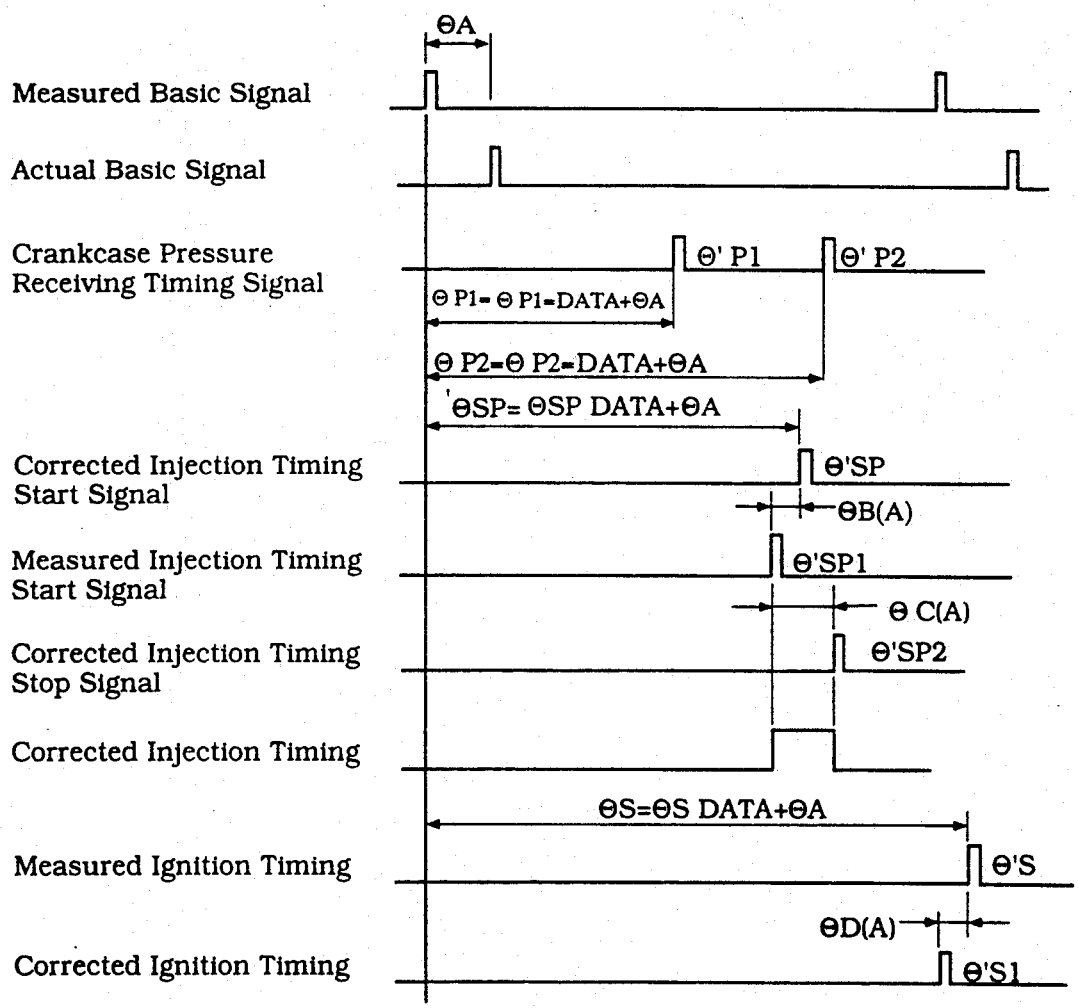
FIG. 5 is a graphical representation showing a desired true timing value relative to an actual measured timing signals, and the derivation of a correction value therefrom.
Figure 7:
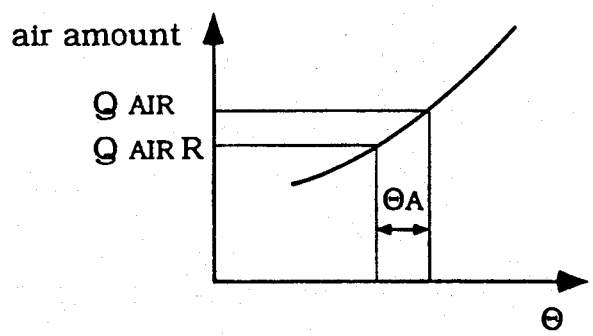
FIG. 7 is a graphical representation showing the quantity of air inducted into the engine crankcase chamber as a function of the crank angle.

FIG. 7 shows the quantity of air in the engine crankcase chamber 30 as a function of the crank angle $\Theta$. As shown in the Figure, from the measured crank angle $\Theta$, a corresponding quantity of intake air is determined from the difference between the final air intake mass $Q_{Air}$ and the residual intake air mass $Q_{AieR}$. If the measured crank angle $\Theta$ is in error, the determined corresponding air quantity will likewise be in error. In order to arrive at a corrected crank angle, the deviation value $\Theta_A$ is added to the measured crank angle value, thus providing an accurate corresponding value for the air intake quantity A upon which the appropriate fuel injection amount may be based. This correction is shown in FIG. 5.

In addition to the intake air mass, crankcase angle and timing measurements transmitted to the injection control device 84, various other engine and ambient inputs such as air temperature, engine temperature, acceleration, deceleration or other operating conditions can be provided so as to provide an appropriate control for the fuel discharge so as to achieve the desired fuel/air ratios throughout the engine running conditions. There is provided an injection timing map memory 86 that is preprogrammed with data as to the desired fuel injection timing initiation and duration $\Theta_{SP}$ which is pre-programmed based upon actual measured engine running characteristics. This signal from the map 86 is adjusted by the correction angle $\Theta_A$ so as to adjust the point of injection timing start $\Theta_{SP1}$ and injection timing stopping $\Theta'_{SP2}$ which is calculated according to the following equations:

$$\Theta'_{SP1} = \Theta'_{SP1DATA} - \Theta_{B(A)}$$

$$\Theta'_{SP2} = \Theta'_{SP2\ DATA} + \Theta_{C(A)}$$

These corrections appear in FIG. 5 and $\Theta_{B(A)}$ represents an adjustment data signal for injection start timing which corresponds to the intake air amount A and is a function of A and $\Theta_{C(A)}$ representing a time data signal relating to the time the injection valve is opened and is a function of intake air amount. These corrections appear in FIG. 5.

Figure 9A:
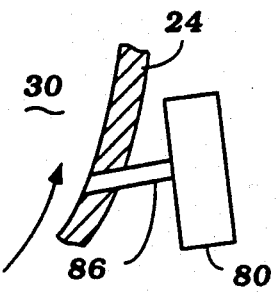
FIG. 9A, 9B and 9C show three embodiments for the placement of a pressure sensor within the wall of the engine crankcase.
Figure 9B:
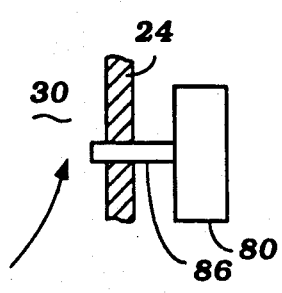
Figure 9C:
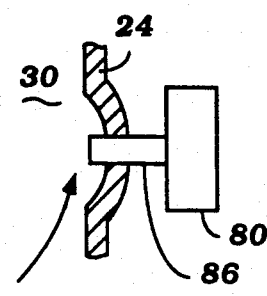

FIGS. 9A, 9B and 9C are cross-sectional views of an engine in accordance with the invention taken through the cylinder bore axis of the engine and show various embodiments regarding the placement of the pressure sensor 80. As depicted in phantom, the pressure sensor 80 may be placed at various positions along the wall of the crankcase 24. It is to be noted that the pressure sensor 80 is preferably placed along a region as remote as possible from the moving components; specifically, the piston 18, connecting rod 20 and the crankshaft 22. Such placement is desirable since these moving components may produce pulsations in the measured air pressure within the engine. Of course, it is desirable to avoid such abnormal pressure variations in the crankcase pressure measurements, upon which the fuel injection amount is ultimately based upon in order to arrive at the optimum injection amount.

Figure 8:
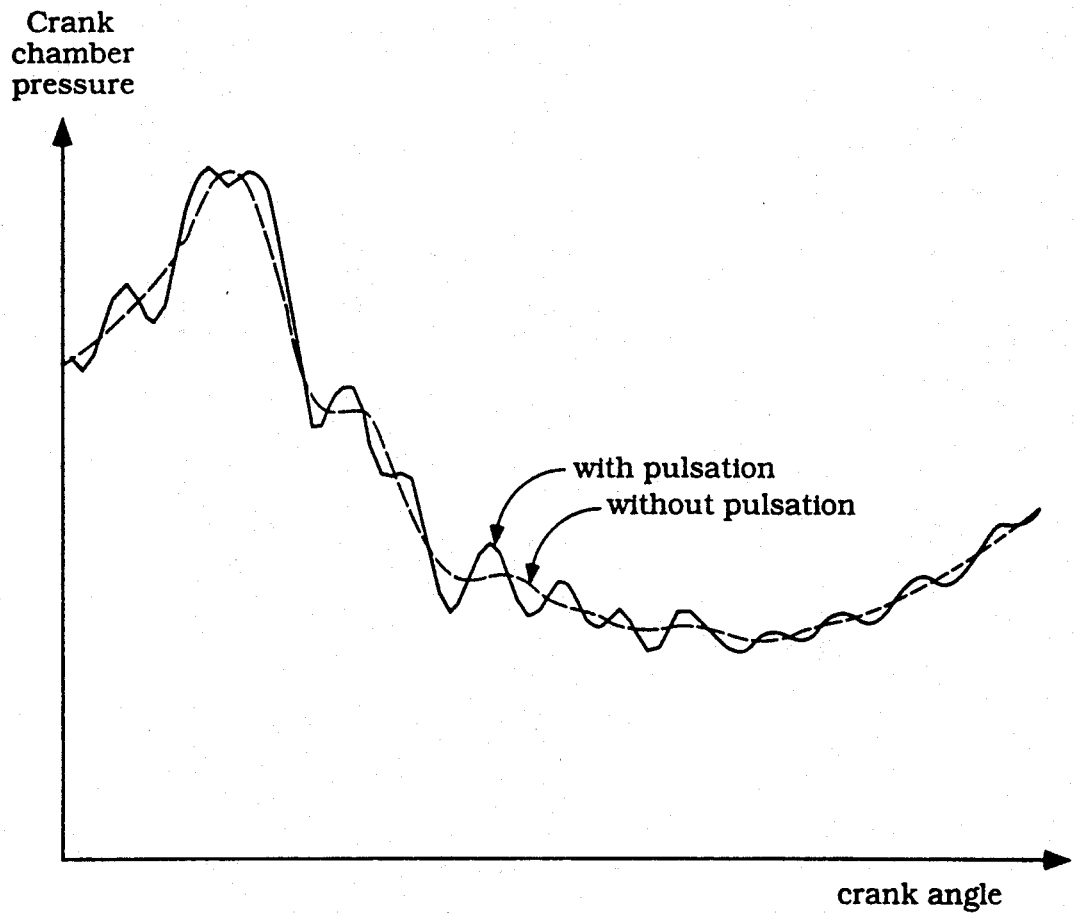
FIG. 8 is a graphical representation showing the air pressure within the crankcase chamber as a function of the crank angle.

FIG. 8 is a graph which shows the crank chamber pressure as a function of the crank angle. The effect of pulsations in the measured air pressure is depicted by the solid line. The pulsations represent fluctuations in the measured crank chamber pressure which are not due to the amount of air inducted alone. Proper placement of the pressure sensor 80 within the engine, at a location remote from the pulsation producing moving components, allows the achievement of a smoother curve, as depicted by the broken line.

Referring again to FIG. 8, it is known that lubricant may flow along the inner side of the wall of the crankcase 24. Such flow is generated by the rotation of the crankshaft 22. In some instances, the lubricant can clog the tip of the pressure sensor 80, thereby hindering its performance or rendering it totally ineffective.

In the embodiment of FIG. 9(A), the tip of the pressure inlet pipe 86 of the pressure sensor 80 is positioned so that lubricant will flow past it without actually entering substantially into the pipe 86 and thereby clogging it. The axis of the inlet pipe 86 forms an acute angle with the line defining the lubricant flow direction along the inner wall of the crankcase 24, from the inlet pipe's point of intersection with the inner wall. Such positioning of the inlet pipe 86 tip is very effective at preventing clogging of the tip as compared to a tip coextensive with the crankcase inner wall which intersects the inner wall at a right angle or is angled so that the tip faces into the direction of lubricant flow.

In the embodiments of FIG. 9(B) and FIG. 9(C), lubricant is most effectively prevented from clogging the inlet pipe 86 tip. In these embodiments, lubricant flowing along the wall of the crankcase chamber 30 cannot enter the tip of the pressure sensor since the tip of the pressure inlet pipe 86 extends beyond the inner wall surface, inwardly into the crankcase chamber 30. Thus, in these two embodiments, the lubricant merely passes around the outer portion of the shaft of the pressure inlet pipe 86, at a position beneath the tip opening.

In the embodiment of FIG. 9(B) the crankcase inner wall is generally planar in the region proximate to the point at which the inlet pipe 86 intersects with it. In the embodiment of FIG. 9(C) the crankcase wall is recessed outward, away from the crankcase chamber interior, in the region proximate to the point at which the inlet pipe 86 intersects with it. The tip of the inlet pipe 86 lies within, or near, the plane of the crankcase inner wall just beyond this recessed portion. Such placement is helpful in avoiding air current interference within the crankcase chamber 30 by the shaft of the inlet pipe 86 which extends therein.

The correction value $\Theta_A$ can additionally be employed within an ignition control circuit 90 (FIGS. 3 and 4) of the engine to correct for errors in the ignition timing due to inaccuracies in the measured timing value.

The ignition control circuit 90 cooperates with the ignition system for the spark plugs 44 which is, in the illustrated embodiment, of the relatively conventional SCR type wherein a charging capacitor 92 is charged from a charging coil 94 of the ignition circuit through a diode 96. An SCR 98 has its gate controlled by the ignition control 90 and when the gate is rendered conductive, the SCR 94 will ground the charged capacitor 92 and induce a voltage in the primary winding of the ignition coil 100 so as to fire the spark plugs 44 in a well known manner.

Figure 6:
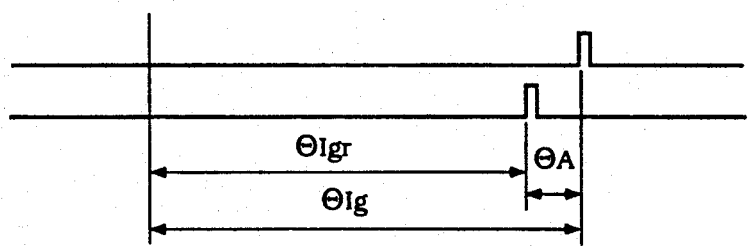
FIG. 6 is a graphical representation showing the desired true ignition timing relative to the actual measured ignition timing, and a correction value therefor.

There is provided an ignition timing map 102 that outputs a signal $\Theta_{SDATA}$ which is indicative of the desired angle of spark ignition as shown in FIG. 6 as $\Theta_{Ig}$. As with the other angular adjustments, it is necessary to adjust the timing $\Theta_{SDATA}$ to the timing $\Theta'_{S1}$ so as to correspond for the offset caused by misalignments of the sensor 64 of the reference signal. The ignition timing signal $\Theta'_{S1}$ is determined according to the following formula:

$$\Theta'_{S1} = \Theta_{SDATA} - \Theta_{S(A)}$$

Wherein $\Theta_{S(A)}$ is a spark advanced adjusting data signal corresponding to the intake amount and which is a function of this amount. These timing corrections are also shown in FIGS. 5 and 6.

Figure 10:
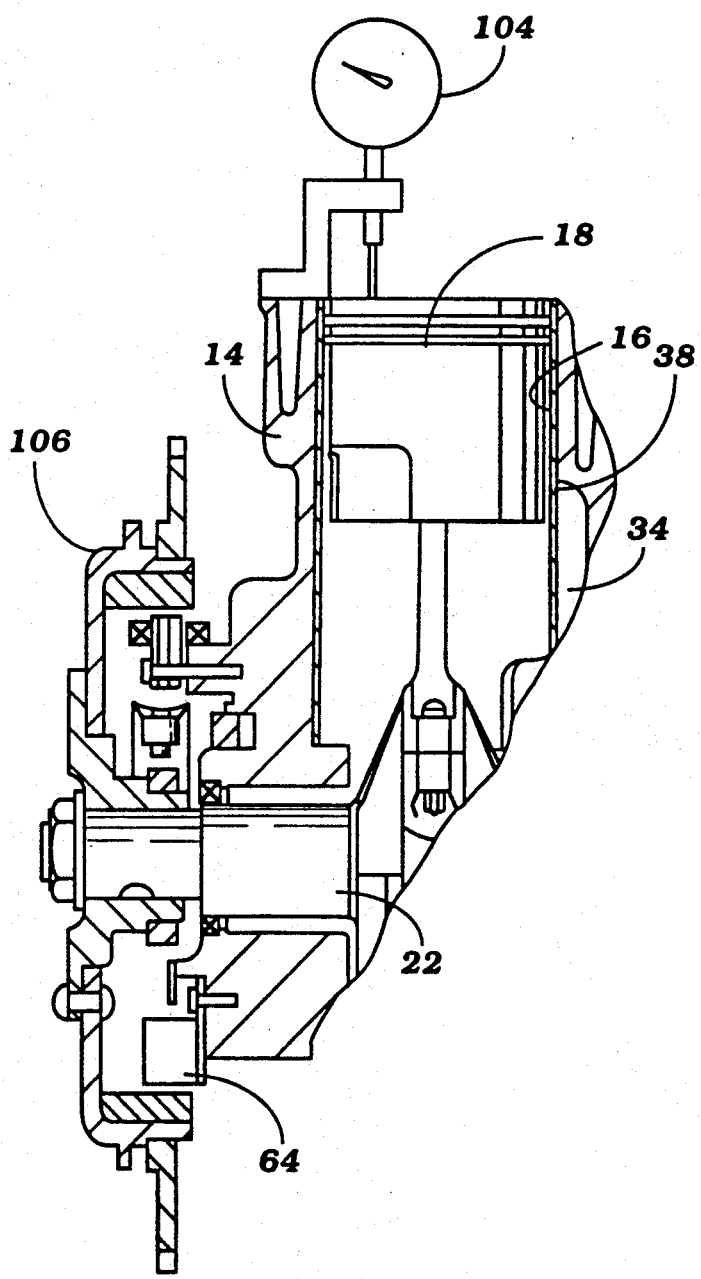
FIG. 10 is a partial cross sectional view, in part similar to FIG. 2, and shows the manner in which the timing correction angle value is measured.

The manner in which the actual correction error $\Theta_A$ is made will now be described by reference to FIG. 10 which is a partial cross sectional view of the engine and shows the cylinder head 45 removed so as to accommodate the placement of a dial indicator 104 on the cylinder block 14 so that it will contact the head of the pistons 18. As a result, as the crankshaft 22 is rotated, the dial indicator 104 will provide an indication when the pistons 18 are at top dead center. The engine flywheel 106 is left in place at this time so that the pulser coil 64 that gives the basic timing reference signal will provide an output. The variable resistor 68 of the circuit 4 is then adjusted so a to provide a voltage signal VA from the voltage source Vcc which is converted into a digital signal from the analog to digital convertor 70 which digital signal NA is fed to the correction value generator 72 so as to output the corrected value $\Theta_A$ indicative of the misalignment of the pulsar coil 64 relative to the flywheel 106. As a result, it is possible to measure the actual misalignment and thus determine the corrective signal $\Theta_A$ so as to make the corrections aforenoted so as to insure that ignition timing and fuel injection timing is exactly proper and also to insure that crankcase pressures are measured at the exact crankcase angle wherein the scavenge ports 38 are at their approximately opened and closed positions so as to permit accurate air measurements and insure the appropriate air/fuel ratio.

It should be readily apparent from the foregoing description that the described embodiment of the invention is extremely effective in providing good event timing in an internal combustion engine. Of course, various changes and modifications may be made without departing from the spirit and scope of the invention. For example, although the invention is described in conjunction with direct cylinder injection, it may be also employed with port injection and such port injectors are shown in FIG. 2. Various other changes and modifications may be made without departing from the spirit and scope of the invention, as defined by the appended claims.

We claim:

1. In a event timing arrangement for an internal combustion engine having an engine output shaft, a pair of relatively moveable components defining a combustion chamber, at least one of said components being operably connected to said engine output shaft for driving said engine output shaft, and timing means for effecting a timed event for said engine at a predetermined angular position of said engine output shaft, the improvement comprising indicating means driven in timed relation to said engine output shaft, a signal generating means fixed relative to one of said engine components and juxtaposed to said indicating means for generating a basic timing signal in response to the passage of said indicating means past said signal generating means and an adjusting circuit for adjusting the output of said signal generating means in order to vary the timing of said signal to adjust for discrepancies in the relative locations of said indicating means and said signal generating means for initiating the operation of said timing means at a precise engine output shaft angle.

2. The timing arrangement of claim 1 further comprising a timing setting means for holding predetermined pre-set timing values for said timing means.

3. The timing arrangement of claim 2 wherein said adjusting circuit comprises a correction value generating device, and an adder for adding said correction value to said pre-set timing values.

4. The timing arrangement of claim 3 further including means for measuring the discrepancy between the relative location of the indicating means and the signal generating means and adjusting the adjusting circuit in response to such measurement.

5. The timing arrangement of claim 3 wherein said adjusting circuit further comprises a variable resistor and an analog/digital converter.

6. The timing arrangement of claim 3 wherein said adder is operative to add said correction value generated by said correction value generating device to each of a plurality said pre-set timing values provided by said timing setting means, thereby generating corrected timing values for each of said plurality of preset timing values.

7. The timing arrangement of claim 6 wherein said correction value is equal to the differences between a predetermined true timing value and said basic timing signal generated according to the measured shaft angle.

8. The timing arrangement of claim 1 further including an ignition system for firing a spark plug for the engine, and wherein the event timed is the firing of the spark plug.

9. The timing arrangement of claim 1 further including means for injecting fuel into the engine and wherein the event timed is the timing of the injection of fuel.

10. The timing arrangement of claim 9 wherein the timing of fuel injection is the initiation of the fuel injection.

11. The timing arrangement of claim 10 wherein the engine is a two cycle, crankcase compression engine and further including means for measuring the air flow to the engine by measuring the pressure differences in the crankcase at timed intervals.

12. The timing arrangement of claim 11 wherein said adjusting circuit comprises a correction value generating device, and an adder for adding said correction value to pre-set timing values.

13. The timing arrangement of claim 11 wherein the timing of the intervals at which the pressure is measured are also controlled by the event timing arrangement.

14. The timing arrangement of claim 13 wherein said adjusting circuit comprises a correction value generating device, and an adder for adding said correction value to pre-set timing values.

15. The timing arrangement of claim 14 further comprising a pressure sensing device for measuring the pressure within the crankcase chamber.

16. The timing arrangement of claim 15 further comprising a crankshaft rotatably disposed within said crankcase, and a piston rod connecting said piston to said crankshaft.

17. The timing arrangement of claim 16 wherein said pressure sensing device is positioned along a region of said crankcase which is remote from said piston, said piston rod and said crankshaft.

18. The timing arrangement of claim 17 wherein said pressure sensing device comprises a pressure inlet pipe having an opening at an outer tip.

19. The timing arrangement of claim 18 wherein said pressure inlet pipe projects through said crankcase and extends inwardly into said crankcase chamber, beyond an inner wall of said crankcase.

20. The timing arrangement of claim 18 wherein said pressure inlet pipe projects through said crankcase, and said opening at said tip of said pressure inlet pipe is coextensive with, and conforms to the curvature of, an inner wall of said crankcase.

21. The timing arrangement of claim 20 wherein an axis extending from said pressure sensing device, through said pressure inlet pipe, is angled downwardly with respect to said inner wall of said crankcase toward a lowermost region of said crankcase chamber.

22. The timing arrangement of claim 15 wherein said pressure sensing device is operative to measure said pressure within said crankcase at said corrected scavenging port opening timing value and at said corrected scavenging for closing timing value.

23. The timing arrangement of claim 22 further comprising an air intake amount calculating system operational to receive said corrected timing values and said air pressure measurements in order to calculate an intake air mass value.

24. The timing arrangement of claim 23 further comprising means for controlling the amount of fuel delivered by said fuel injection device.

25. The timing arrangement of claim 24 wherein said fuel injection amount controlling means includes an electronic control unit, said electric control unit operable to receive various input signals, indicative of engine operating conditions, and to output a control signal for controlling said fuel injection device.

26. The timing arrangement of claim 25 wherein said input signals include said intake air mass value.

27. The timing arrangement of claim 8 further comprising an ignition control circuit having an arrangement for determining a measured ignition timing value.

28. The timing arrangement of claim 27 wherein said adjusting circuit comprises a correction value generating device and an adder for adding said timing correction value to said measured ignition timing value, thereby generating a corrected ignition timing value.

29. The timing arrangement of claim 28 wherein said adjusting circuit further comprises a variable resistor and an analog/digital converter.

30. The timing arrangement of claim 29 wherein said correction value is equal to the difference between a predetermined true timing value and said basic timing signal generated according to the measured crank angle.

31. In a event timing method for an internal combustion engine having an engine output shaft, a pair of relatively moveable components defining a combustion chamber, at least one of said components being operably connected to said engine output shaft for driving said engine output shaft, and timing means for effecting a timed event for said engine at a predetermined angular position of said engine output shaft, indicating means driven in timed relation to said engine output shaft, a signal generating means fixed relative to one of said engine components and juxtaposed to said indicating means for generating a basic timing signal in response to the passage of said indicating means past said signal generating means, said method comprising the steps of adjusting the output of said signal generating means in order to vary the timing of said signal to adjust for discrepancies in the relative locations of said indicating means and said signal generating means for initiating the operation of said timing means at a precise engine output shaft angle.

32. The timing method of claim 31 further comprising a timing setting means for holding predetermined pre-set timing values for said timing means.

33. The timing method of claim 32 wherein said adjusting circuit comprises a correction value generating device, and an adder for adding said correction value to said pre-set timing values.

34. The timing method of claim 33 further including means the steps of measuring the discrepancy between the relative location of the indicating means and the signal generating means and adjusting the adjusting circuit in response to such measurement.

35. The timing method of claim 33 wherein said adjusting circuit further comprises a variable resistor and an analog/digital converter.

36. The timing method of claim 33 wherein said adder is operative to add said correction value generated by said correction value generating device to each of a plurality said pre-set timing values provided by said timing setting means, thereby generating corrected timing values for each of said plurality of preset timing values.

37. The timing method of claim 36 wherein said correction value is equal to the difference between a predetermined true timing value and said basic timing signal generated according to the measured shaft angle.

38. The timing method of claim 31 further including an ignition system for firing a spark plug for the engine, and wherein the event timed is the firing of the spark plug.

39. The timing method of claim 31 further including means for injecting fuel into the engine and wherein the event timing is the timing of the injection of fuel.

40. The timing method of claim 39 wherein the timing of fuel injection is the initiation of the fuel injection.

41. The timing method of claim 40 wherein the engine is a two cycle, crankcase compression engine and further including means for measuring the air flow to the engine by measuring the pressure differences in the crankcase at timed intervals.

42. The timing method of claim 41 wherein said adjusting circuit comprises a correction value generating device, and an adder for adding said correction value to said pre-set timing values.

43. The timing method of claim 41 wherein the timing of the intervals at which the pressure is measured are also controlled by the event timing arrangement.

44. The timing method of claim 43 wherein said adjusting circuit comprises a correction value generating device, and an adder for adding said correction value to said pre-set timing values.

45. The timing method of claim 44 further comprising a pressure sensing device for measuring the pressure within the crankcase chamber.

46. The timing method of claim 45 further comprising a crankshaft rotatably disposed within said crankcase, and a piston rod connecting said piston to said crankshaft.

47. The timing method of claim 46 wherein said pressure sensing device is positioned along a region of said crankcase which is remote from said piston, said piston rod and said crankshaft.

48. The timing method of claim 47 wherein said pressure sensing device comprises a pressure inlet pipe having an opening at an outer tip.

49. The timing method of claim 48 wherein said pressure inlet pipe projects through said crankcase and extends inwardly into said crankcase chamber, beyond an inner wall of said crankcase.

50. The timing method of claim 48 wherein said pressure inlet pipe projects through said crankcase, and said opening at said tip of said pressure inlet pipe is coextensive with, and conforms to the curvature of, an inner wall of said crankcase.

51. The timing method of claim 50 wherein an axis extending from said pressure sensing device, through said pressure inlet pipe, is angled downwardly with respect to said inner wall of said crankcase toward a lowermost region of said crankcase chamber.

52. The timing method of claim 45 wherein said pressure sensing device is operative to measure said pressure within said crankcase at said corrected scavenging port opening timing value and at said corrected scavenging port closing timing value.

53. The timing method of claim 52 further comprising an air intake amount calculating system operational to receive said corrected timing values and said air pressure measurements in order to calculate an intake air mass value.

54. The timing method of claim 53 further comprising means for controlling the amount of fuel delivered by said fuel injection device.

55. The timing method of claim 54 wherein said fuel injection amount controlling means includes an electronic control unit, said electric control unit operable to receive various input signals, indicative of engine operating conditions, and to output a control signal for controlling said fuel injection device.

56. The timing method of claim 55 wherein said input signals include said intake air mass value.

57. The timing method of claim 38 further comprising an ignition control circuit having an arrangement for determining a measured ignition timing value.

58. The timing method of claim 57 wherein said adjusting circuit comprises a correction value generating device and an adder for adding said timing correction value to said measured ignition timing value, thereby generating a corrected ignition timing value.

59. The timing method of claim 58 wherein said adjusting circuit further comprises a variable resistor and an analog/digital converter.

60. The timing method of claim 59 wherein said correction value is equal to the difference between a predetermined true timing value and said basic timing signal generated according to the measured crank angle.

* * * * *

UNITED STATES PATENT AND TRADEMARK OFFICE
CERTIFICATE OF CORRECTION

PATENT NO. : 5,219,398  Page 1 of 7

DATED : June 15, 1993

INVENTOR(S) : Nonaka, et al

It is certified that error appears in the above-indentified patent and that said Letters Patent is hereby corrected as shown below:

Column 12, line 5, Claim 22, "for" should be --port--.

Column 14, line 54, insert the following claims:

--61. In a fuel injection arrangement for an internal combustion engine having a crankcase with a crankcase chamber therein, an induction system for delivering an air charge to the crankcase chamber, a combustion chamber, a cylinder disposed between said crankcase chamber and said combustion chamber, a piston reciprocally disposed within said cylinder, a scavenging passage for delivering the air charge from the crankcase chamber to the combustion chamber, said scavenging passage having a port communicating said scavenging passage with said crankcase chamber and through which said air charge passes, and a fuel injection device for delivering an amount of fuel for mixing with the air charge; the improvement comprising a crank angle measuring device; a pulser coil for generating a basic timing signal according to the measured crank angle; and an adjusting circuit for changing the tuning of the pulser coil in order to vary the output signal; and further comprising a timing setting means for holding predetermined pre-set timing values.

62. The fuel injection arrangement of claim 61 wherein said pre-set timing values indicate timings at which said scavenging port opens and said scavenging port closes, respectively.

63. The fuel injection arrangement of claim 62 wherein said adjusting circuit comprises a correction value generating device, and an adder for adding said correction value to said pre-set timing values.

64. The fuel injection arrangement of claim 63 wherein said adjusting circuit further comprises a variable resistor for an analog/digital converter.

UNITED STATES PATENT AND TRADEMARK OFFICE
CERTIFICATE OF CORRECTION

PATENT NO. : 5,219,398

DATED : June 15, 1993

INVENTOR(S) : Nonaka, et al

It is certified that error appears in the above-indentified patent and that said Letters Patent is hereby corrected as shown below:

65. The fuel injection arrangement of claim 63 wherein said adder is operative to add said correction value generated by said correction value generating device to each of said pre-set timing values provided by said timing setting means, thereby generating corrected timing values for each of said scavenging port opening timing and scavenging port closing timing, respectively.

66. The fuel injection arrangement of claim 65 wherein said correction value is equal to the difference between a predetermined true timing value and said basic timing signal generated according to the measured crank angle.

67. The fuel injection arrangement of claim 66 further comprising a pressure sensing device for measuring the pressure within the crankcase chamber.

68. The fuel injection arrangement of claim 67 further comprising a crankshaft rotatably disposed within said crankcase, and a piston rod connecting said piston to said crankshaft.

69. The fuel injection arrangement of claim 68 wherein said pressure sensing device is positioned along a region of said crankcase which is remote from said piston, said piston rod and said crankshaft.

70. The fuel injection arrangement of claim 69 wherein said pressure sensing device comprises a pressure inlet pipe having an opening at an outer tip.

UNITED STATES PATENT AND TRADEMARK OFFICE
CERTIFICATE OF CORRECTION

PATENT NO. : 5,219,398            Page 3 of 7

DATED : June 15, 1993

INVENTOR(S) : Nonaka, et al

It is certified that error appears in the above-indentified patent and that said Letters Patent is hereby corrected as shown below:

71. The fuel injection arrangement of claim 70 wherein said pressure inlet pipe projects through said crankcase and extends inwardly into said crankcase chamber, beyond an inner wall of said crankcase.

72. The fuel injection arrangement of claim 70 wherein said pressure inlet pipe projects through said crankcase, and said opening at said tip of said pressure inlet pipe is coextensive with, and conforms to the curvature of, an inner wall of said crankcase.

73. The fuel injection arrangement of claim 72 wherein an axis extending from said pressure sensing device, through said pressure inlet pipe, is angled downwardly with respect to said inner wall of said crankcase toward a lowermost region of said crankcase chamber.

74. The fuel injection arrangement of claim 67 wherein said pressure sensing device is operative to measure said pressure within said crankcase at said corrected scavenging port opening timing value and at said corrected scavenging port closing timing value.

75. The fuel injection arrangement of claim 74 further comprising an air intake amount calculating system operational to receive said corrected timing values and said air pressure measurements in order to calculate an intake air mass value.

76. The fuel injection arrangement of claim 75 further comprising a display unit

UNITED STATES PATENT AND TRADEMARK OFFICE
CERTIFICATE OF CORRECTION

PATENT NO. : 5,219,398  
DATED : June 15, 1993  
INVENTOR(S) : Nonaka, et al

Page 4 of 7

It is certified that error appears in the above-indentified patent and that said Letters Patent is hereby corrected as shown below:

for displaying said intake air mass value.

77. The fuel injection arrangement of claim 75 further comprising means for controlling the amount of fuel delivered by said fuel injection device.

78. The fuel injection arrangement of claim 77 wherein said fuel injection amount controlling means includes an electronic control unit, said electronic control unit operable to receive various input signals, indicative of engine operating conditions, and to output a control signal for controlling said fuel injection device.

79. The fuel injection arrangement of claim 78 wherein said input signals include said intake air mass value.

80. In a fuel injection arrangement for an internal combustion engine having a crankcase with a crankcase chamber therein, an induction system for delivering an air charge to the crankcase chamber, a combustion chamber, a cylinder disposed between said crankcase chamber and said combustion chamber, a piston reciprocally disposed within said cylinder, a scavenging passage for delivering the air charge from the crankcase chamber to the combustion chamber, said scavenging passage having a port communicating said scavenging passage with said crankcase chamber and through which said air charge passes, and a fuel injection device for delivering an amount of fuel for mixing with the air charge; the improvement comprising a crank angle measuring device; a pulser coil for generating a basic timing signal according to the measured crank angle; and an adjusting circuit for changing the tuning of the

UNITED STATES PATENT AND TRADEMARK OFFICE
CERTIFICATE OF CORRECTION

PATENT NO. : 5,219,398

DATED : June 15, 1993

INVENTOR(S) : Nonaka, et al

It is certified that error appears in the above-indentified patent and that said Letters Patent is hereby corrected as shown below:

pulser coil in order to vary the output signal; and further comprising an ignition control circuit having an arrangement for determining a measured ignition timing value.

81. The fuel injection arrangement of claim 80 wherein said adjusting circuit comprises a correction value generating device for generating a timing correction value and an adder for adding a timing correction value to said measured ignition timing value, thereby generating a corrected ignition timing value.

82. The fuel injection arrangement of claim 81 wherein said adjusting circuit further comprises a variable resistor and an analog/digital converter.

83. The fuel injection arrangement of claim 82 wherein said correction value is equal to the difference between a predetermined true timing value and said basic timing signal generated according to the measured crank angle.

84. A method of controlling a fuel injection system for an internal combustion engine having a crankcase chamber, an induction system for delivering an air charge to the crankcase chamber, a combustion chamber, a cylinder disposed between said crankcase chamber and said combustion chamber, a piston reciprocally disposed within said cylinder, a scavenging passage for delivering the air charge from the crankcase chamber to the combustion chamber, said scavenging passage having a port communicating said scavenging passage with said crankcase chamber and through which said air charge passes, and a fuel injection device for delivering an

UNITED STATES PATENT AND TRADEMARK OFFICE
CERTIFICATE OF CORRECTION

PATENT NO. : 5,219,398

DATED : June 15, 1993

INVENTOR(S) : Nonaka, et al

It is certified that error appears in the above-indentified patent and that said Letters Patent is hereby corrected as shown below:

amount of fuel for mixing with the air charge comprising the steps of storing predetermined pre-set timing values; detecting an opening timing and a closing timing of said port as said piston reciprocates thereby; employing said stored predetermined pre-set timing values for correcting for any errors in said detected timing arrangements; measuring the air pressure within said crankcase chamber at both the corrected opening timing and closing timing; calculating an intake air mass from the air pressure measurements; and controlling the amount of fuel discharged by the fuel injection means in response to the calculated intake air mass value.

85. A method of controlling an ignition system for an internal combustion engine having a crankcase chamber, an induction system for delivering an air charge to the crankcase chamber, a combustion chamber, a cylinder disposed between said crankcase chamber and said combustion chamber, a piston reciprocally disposed within said cylinder, a scavenging passage for delivering the air charge from the crankcase chamber to the combustion chamber, said scavenging passage having a port communicating said scavenging passage with said crankcase chamber and through which said air charge passes, and a fuel injection device for delivering an amount of fuel for mixing with the air charge comprising the steps of detecting an opening timing and a closing timing of said port as said piston reciprocates thereby; generating a correction value for correcting for any errors in said detected timing measurements; and determining a measured ignition timing value.

UNITED STATES PATENT AND TRADEMARK OFFICE
CERTIFICATE OF CORRECTION

PATENT NO. : 5,219,398

DATED : June 15, 1993

INVENTOR(S) : Nonaka, et al

Page 7 of 7

It is certified that error appears in the above-indentified patent and that said Letters Patent is hereby corrected as shown below:

86. A method of controlling an ignition system for an internal combustion engine, as recited in claim 85, further including the step of generating a corrected ignition timing value based upon said measured ignition timing value and said generated correction value.--

Signed and Sealed this

Twenty-second Day of March, 1994

Attest:

BRUCE LEHMAN

Attesting Officer

Commissioner of Patents and Trademarks